(12) United States Patent
Fujimaki

(10) Patent No.: US 11,537,462 B2
(45) Date of Patent: Dec. 27, 2022

(54) APPARATUSES AND METHODS FOR CYCLIC REDUNDANCY CALCULATION FOR SEMICONDUCTOR DEVICE

(71) Applicant: Micron Technology, Inc., Boise, ID (US)

(72) Inventor: Ryo Fujimaki, Kanagawa (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/037,538

(22) Filed: Sep. 29, 2020

(65) Prior Publication Data

US 2022/0100602 A1 Mar. 31, 2022

(51) Int. Cl.
G06F 11/10 (2006.01)
G06F 11/22 (2006.01)

(52) U.S. Cl.
CPC .............................. G06F 11/1004 (2013.01)

(58) Field of Classification Search
None
See application file for complete search history.

(56) References Cited

U.S. PATENT DOCUMENTS

| | | | | |
|---|---|---|---|---|
| 5,602,857 A * | 2/1997 | Zook | ................... | G11B 27/3027 714/769 |
| 6,421,805 B1 * | 7/2002 | McAuliffe | .......... | H03M 13/091 714/756 |
| 8,020,069 B1 * | 9/2011 | Feng | ................... | G11B 20/1866 714/781 |
| 8,327,201 B1 * | 12/2012 | Lai | ................. | G01R 31/318513 714/725 |
| 10,963,411 B1 * | 3/2021 | Voogel | ..................... | G06F 13/20 |
| 2001/0056563 A1 * | 12/2001 | Kodama | ............... | H03M 13/29 714/758 |
| 2005/0285862 A1 * | 12/2005 | Noda | .................... | G11C 7/1006 345/502 |
| 2006/0026349 A1 * | 2/2006 | Gower | ................ | G06F 13/4022 711/115 |
| 2006/0123312 A1 * | 6/2006 | Forhan | ................ | G06F 11/1092 714/E11.034 |
| 2009/0196093 A1 * | 8/2009 | Happ | ................. | G11C 13/0004 365/163 |
| 2010/0005365 A1 * | 1/2010 | Buchmann | .............. | G06F 11/10 714/758 |
| 2011/0214040 A1 * | 9/2011 | Kosakowski | ......... | H03M 13/23 714/807 |
| 2012/0221750 A1 * | 8/2012 | Na | ........................ | G11C 7/1012 710/35 |

(Continued)

Primary Examiner — Cynthia Britt
Assistant Examiner — Dipakkumar B Gandhi
(74) Attorney, Agent, or Firm — Dorsey & Whitney LLP

(57) ABSTRACT

Apparatuses and methods of data error check for semiconductor devices are described. An example apparatus includes a plurality of data queue circuits and a CRC combine circuit. The plurality of data queue circuits includes a plurality of CRC calculator circuits. The plurality of CRC calculator circuits includes a CRC calculator circuit. The CRC calculator circuit receives a plurality of data bits and one or more check bits and further provides a plurality of CRC calculation bits. The CRC combine circuit receives the plurality of CRC calculation bits from the plurality of CRC calculator circuits, and further provides a result signal responsive to, at least in part, to the plurality of CRC calculation bits.

20 Claims, 13 Drawing Sheets

(56) References Cited

U.S. PATENT DOCUMENTS

2013/0082736 A1* 4/2013 Dono ................. G11C 8/08
326/68
2015/0007003 A1* 1/2015 Pepper ............... G06F 11/1004
714/807

* cited by examiner

| Function | Transfer | | | | | | | | | |
|---|---|---|---|---|---|---|---|---|---|---|
| | 0 | 1 | 2 | 3 | 4 | 5 | 6 | 7 | 8 | 9 |
| DQ0 | D0 | D1 | D2 | D3 | D4 | D5 | D6 | D7 | CRC0 | 1 |
| DQ1 | D8 | D9 | D10 | D11 | D12 | D13 | D14 | D15 | CRC1 | 1 |
| DQ2 | D16 | D17 | D18 | D19 | D20 | D21 | D22 | D23 | CRC2 | 1 |
| DQ3 | D24 | D25 | D26 | D27 | D28 | D29 | D30 | D31 | CRC3 | 1 |
| DQ3 | D32 | D33 | D34 | D35 | D36 | D37 | D38 | D39 | CRC4 | 1 |
| DQ5 | D40 | D41 | D42 | D43 | D44 | D45 | D46 | D47 | CRC5 | 1 |
| DQ6 | D48 | D49 | D50 | D51 | D52 | D53 | D54 | D55 | CRC6 | 1 |
| DQ7 | D56 | D57 | D58 | D59 | D60 | D61 | D62 | D63 | CRC7 | 1 |
| DM_n/ DBI_n | D64 | D65 | D66 | D67 | D68 | D69 | D70 | D71 | 1 | 1 |

FIG. 5A

Equations      "^" means XOR Logic

CRC[0] =D[69]^D[68]^D[67]^D[66]^D[64]^D[63]^D[60]^D[56]^D[54]^D[53]^D[52]^D[50]^
D[49]^D[48]^D[45]^D[43]^D[40]^D[39]^D[35]^D[34]^D[31]^D[30]^D[28]^D[23]^
D[21]^D[19]^D[18]^D[16]^D[14]^D[12]^D[8]^D[7]^D[6]^D[0];

CRC[1] =D[70]^D[66]^D[65]^D[63]^D[61]^D[60]^D[57]^D[56]^D[55]^D[52]^D[51]^D[48]^
D[46]^D[45]^D[44]^D[43]^D[41]^D[39]^D[36]^D[34]^D[32]^D[30]^D[29]^D[28]^
D[24]^D[23]^D[22]^D[21]^D[20]^D[18]^D[17]^D[16]^D[15]^D[14]^D[13]^D[12]^
D[9]^D[6]^D[1]^D[0];

CRC[2] =D[71]^D[69]^D[68]^D[63]^D[62]^D[61]^D[60]^D[58]^D[57]^D[54]^D[50]^D[48]^
D[47]^D[46]^D[44]^D[43]^D[42]^D[39]^D[37]^D[34]^D[33]^D[29]^D[28]^D[25]^
D[24]^D[22]^D[17]^D[15]^D[13]^D[12]^D[10]^D[8]^D[6]^D[2]^D[1]^D[0];

CRC[3] =D[70]^D[69]^D[64]^D[63]^D[62]^D[61]^D[59]^D[58]^D[55]^D[51]^D[49]^D[48]^
D[47]^D[45]^D[44]^D[43]^D[40]^D[38]^D[35]^D[34]^D[30]^D[29]^D[26]^D[25]^
D[23]^D[18]^D[16]^D[14]^D[13]^D[11]^D[9]^D[7]^D[3]^D[2]^D[1];

CRC[4] =D[71]^D[70]^D[65]^D[64]^D[63]^D[62]^D[60]^D[59]^D[56]^D[52]^D[50]^D[49]^
D[48]^D[46]^D[45]^D[44]^D[41]^D[39]^D[36]^D[35]^D[31]^D[30]^D[27]^D[26]^
D[24]^D[19]^D[17]^D[15]^D[14]^D[12]^D[10]^D[8]^D[4]^D[3]^D[2];

CRC[5] =D[71]^D[66]^D[65]^D[64]^D[63]^D[61]^D[60]^D[57]^D[53]^D[51]^D[50]^D[49]^
D[47]^D[46]^D[45]^D[42]^D[40]^D[37]^D[36]^D[32]^D[31]^D[28]^D[27]^D[25]^
D[20]^D[18]^D[16]^D[15]^D[13]^D[11]^D[9]^D[5]^D[4]^D[3];

CRC[6] =D[67]^D[66]^D[65]^D[64]^D[62]^D[61]^D[58]^D[54]^D[52]^D[51]^D[50]^D[48]^
D[47]^D[46]^D[43]^D[41]^D[38]^D[37]^D[33]^D[32]^D[29]^D[28]^D[26]^D[21]^
D[19]^D[17]^D[16]^D[14]^D[12]^D[10]^D[6]^D[5]^D[4];

CRC[7] =D[68]^D[67]^D[66]^D[65]^D[63]^D[62]^D[59]^D[55]^D[53]^D[52]^D[51]^D[49]^
D[48]^D[47]^D[44]^D[42]^D[39]^D[38]^D[34]^D[33]^D[30]^D[29]^D[27]^D[22]^
D[20]^D[18]^D[17]^D[15]^D[13]^D[11]^D[7]^D[6]^D[5];

FIG. 5B

CRC[0] =D[69]^D[68]^D[67]^D[66]^D[64]^D[63]^D[60]^
        D[56]^D[54]^D[53]^D[52]^D[50]^D[49]^D[48]^
        D[45]^D[43]^D[40]^D[39]^D[35]^D[34]^D[31]^
        D[30]^D[28]^D[23]^D[21]^D[19]^D[18]^D[16]^
        D[14]^D[12]^D[8]^D[7]^D[6]^D[0];

| | |
|---|---|
| D[69]^D[68]^D[67]^D[66]^D[64] | → Calculate at DM |
| D[63]^D[60]^D[56] | → Calculate at DQ7 |
| D[54]^D[53]^D[52]^D[50]^D[49]^D[48] | → Calculate at DQ6 |
| D[45]^D[43]^D[40] | → Calculate at DQ5 |
| D[39]^D[35]^D[34] | → Calculate at DQ4 |
| D[31]^D[30]^D[28] | → Calculate at DQ3 |
| D[23]^D[21]^D[19]^D[18]^D[16] | → Calculate at DQ2 |
| D[14]^D[12]^D[8] | → Calculate at DQ1 |
| D[7]^D[6]^D[0]^ CRC[0] | → Calculate at DQ0 |

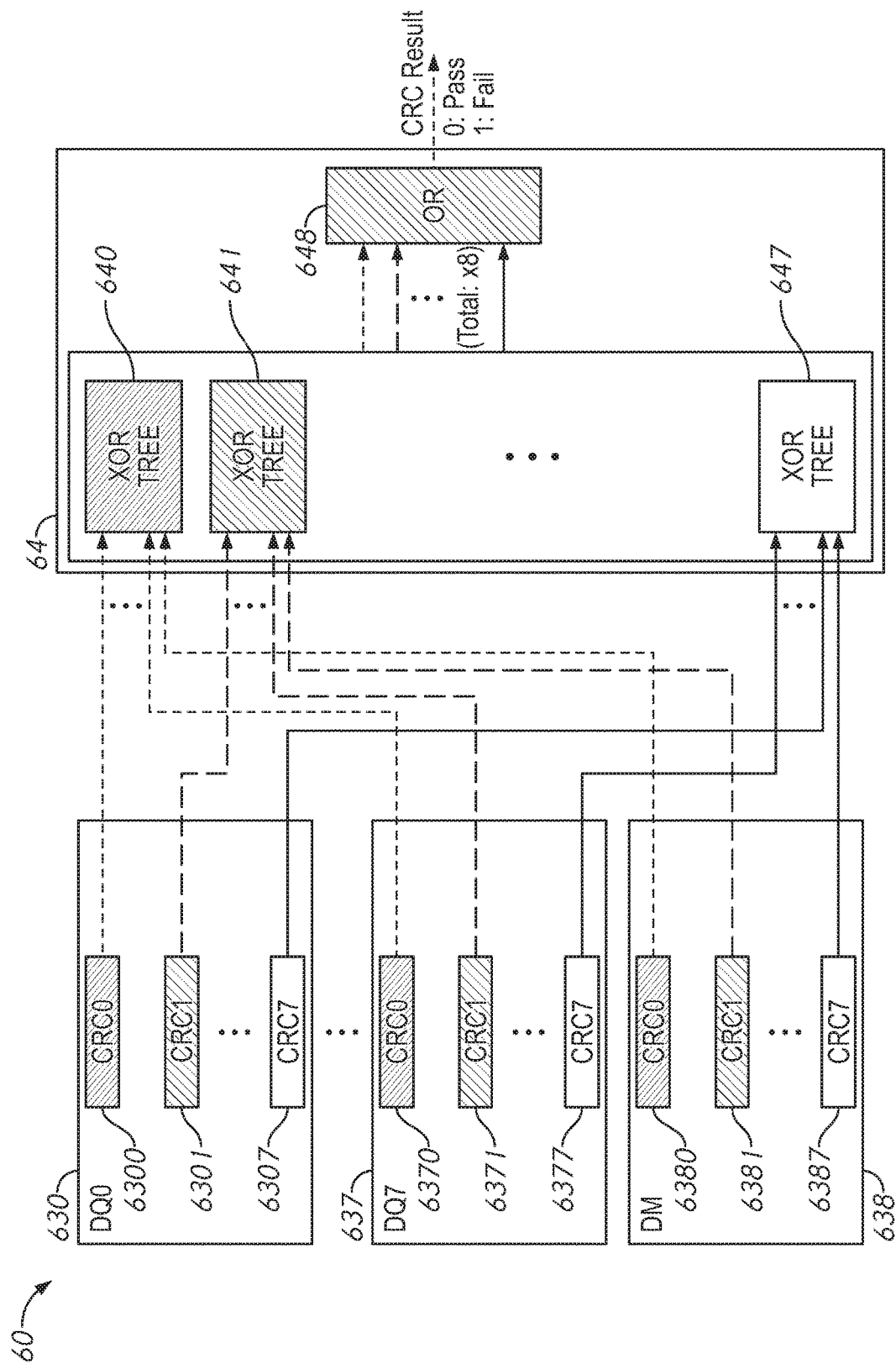

US 11,537,462 B2

APPARATUSES AND METHODS FOR CYCLIC REDUNDANCY CALCULATION FOR SEMICONDUCTOR DEVICE

BACKGROUND

High data reliability, high speed of memory access, lower power consumption and reduced chip size are features that are demanded from semiconductor memory. To enhance data capacities, multiple memory cell arrays of multiple bank groups have been employed. Typically, each data bus of a particular bank group is adjacent data buses of other bank groups. To prevent noise across the data buses, however, the data buses of the bank groups are spaced apart from each other, or shield lines are disposed between data buses. In addition, in order to detect accidental changes to data, a cyclic redundancy check (CRC) is employed among semiconductor devices. A CRC calculator receives data input from data queues (DQs) and the CRC bits, and determines the accuracy of the data using the CRC bits. The CRC bits are transmitted on additional signal lines of the data buses. Transmitting CRC bits require additional data bus area due to the additional signal lines for the CRC bits, and the need for spacing apart the data buses.

In recent years, three-dimensional (3D) memory devices have been introduced. Some 3D memory devices are formed by stacking dice vertically and interconnecting the dice using through-silicon (or through-substrate) vias (TSVs). Benefits of the 3D memory devices include shorter interconnects which reduce circuit delays and power consumption, a large number of vertical vias between layers which allow wide bandwidth buses between functional blocks in different layers, and a considerably smaller footprint. Thus, the 3D memory devices contribute to higher memory access speed, lower power consumption and chip size reduction. Example 3D memory devices include Hybrid Memory Cube (HMC) and High Bandwidth Memory (HBM). Another type of 3D memory device is called "Master-Slave Memory." For example, the Master-Slave Memory is a type of memory including a plurality of random access memory (DRAM) dies vertically stacked with each other, in which the lowermost one of the DRAM dies serves as a master die and remaining one or ones of DRAM dies serve as a slave die.

Recently, many memory devices support a CRC checksum function used for error detection. When a CRC error detection is implemented in such devices, the master die as well as the slave dies execute CRC calculations. The large number of TSVs between layers also include a large number of TSVs that transmit CRC bits, as well as a large number of data bits. Such TSVs occupy extra area on each die.

BRIEF DESCRIPTION OF THE DRAWINGS

FIG. 5A is a table of CRC data bit mapping for an apparatus including eight DQ circuits and a DM circuit, in accordance with an embodiment of the present disclosure.

FIG. 5B is a list of equations to calculate each CRC bit of a plurality of CRC bits in FIG. 5A, in accordance with an embodiment of the present disclosure.

FIG. 6 is a schematic diagram of logical computation flows in the apparatus of FIG. 4, in accordance with an embodiment of the present disclosure.

DETAILED DESCRIPTION

Various embodiments of the disclosure will be explained below in detail with reference to the accompanying drawings. The following detailed description refers to the accompanying drawings that show, by way of illustration, specific aspects and details in which embodiments of the disclosure may be practiced. The detailed description includes sufficient detail to enable those skilled in the art to practice embodiments of the disclosure. Other embodiments may be utilized, and structure, logical and electrical changes may be made without departing from the scope of the present disclosure. The various embodiments disclosed herein are not necessary mutually exclusive, as some disclosed embodiments can be combined with one or more other disclosed embodiments to form new embodiments.

Figure 1:
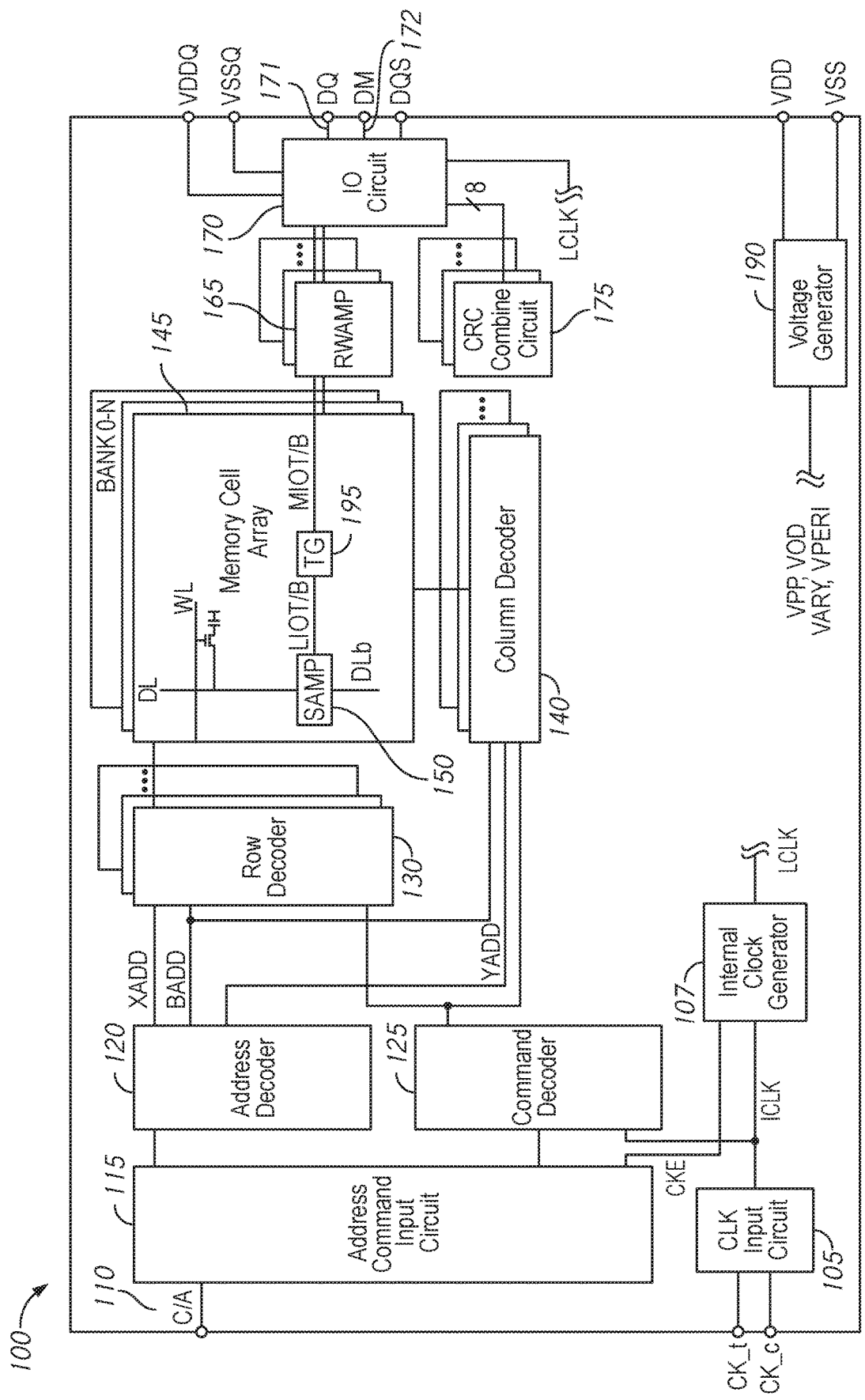
FIG. 1 is a block diagram of an apparatus in accordance with an embodiment of the present disclosure.

FIG. 1 is a schematic block diagram of a semiconductor device 100, in accordance with an embodiment of the present disclosure. The semiconductor device 100 may include a clock input circuit 105, an internal clock generator 107, an address command input circuit 115, an address decoder 120, a command decoder 125, a plurality of row (e.g., first access line) decoders 130, a memory cell array 145 including sense amplifiers 150 and transfer gates 195, a plurality of column (e.g., second access line) decoders 140, a plurality of read/write amplifiers 165, an input/output (I/O) circuit 170, and a voltage generator 190. The semiconductor device 100 may include a plurality of external terminals including address and command terminals coupled to command/address bus 110, clock terminals CK_t and CK_c, data terminals DQ 171, DQS, and DM 172, and power supply terminals VDD, VSS, VDDQ, and VSSQ. The terminals and signal lines associated with the command/address bus 110 may include a first set of terminals and signal lines that are configured to receive the command signals and a separate, second set of terminals and signal lines that configured to receive the address signals, in some examples. In other examples, the terminals and signal lines associated with the command and address bus 110 may include common terminals and signal lines that are configured to receive both command signal and address signals. The semiconductor device may be mounted on a substrate, for example, a memory module substrate, a motherboard or the like.

The memory cell array 145 includes a plurality of banks BANK0-N, where N is a positive integer, such as 3, 7, 15, 31, etc. Each bank BANK0-N may include a plurality of word lines WL, a plurality of digit lines DL and their complementary digit lines DLb, and a plurality of memory cells MC arranged at intersections of the plurality of word lines WL and the plurality of digit lines DL. The selection of the word line WL for each bank BANK0-N is performed by a corresponding row decoder 130 and the selection of the digit line DL is performed by a corresponding column decoder 140. The plurality of sense amplifiers 150 are located for their corresponding digit lines DL and their corresponding complementary digit lines DLb, and coupled to at least one respective local I/O line further coupled to a respective one of at least two main I/O line pairs, via transfer gates TG 195, which function as switches. The sense amplifiers 150 and transfer gates TG 195 may be operated based on control signals from decoder circuitry, which may include the command decoder 120, the row decoders 130, the column decoders 140, any control circuitry of the memory cell array 145 of the banks BANK0-N, or any combination thereof.

The address/command input circuit 115 may receive an address signal and a bank address signal from outside at the command/address terminals via the command/address bus 110 and transmit the address signal and the bank address signal to the address decoder 120. The address decoder 120 may decode the address signal received from the address/command input circuit 115 and provide a row address signal XADD to the row decoder 130, and a column address signal YADD to the column decoder 140. The address decoder 120 may also receive the bank address signal and provide the bank address signal BADD to the row decoder 130 and the column decoder 140.

The address/command input circuit 115 may receive a command signal from outside, such as, for example, a memory controller at the command/address terminals via the command/address bus 110 and provide the command signal to the command decoder 125. The command decoder 125 may decode the command signal and generate various internal command signals. The internal command signals may be used to control operation and timing of various circuits of the semiconductor device 100. For example, the internal command signals may include row and column command signals to control circuits to perform access operations to selected word lines and digit lines, such as a read command or a write command.

Responsive to activate and read commands provided with a row address and a column address, read data is read from a memory cell in the memory cell array 145 designated by the row address and the column address. The read/write amplifiers 165 may receive the read data DQ and provide the read data DQ to the IO circuit 170. The IO circuit 170 may provide the read data DQ to outside via the data terminals DQ, DQS and DM together with a data strobe signal at DQS and a signal at DM. Similarly, when activate and write commands are provided and a row address and a column address are provided with the activate and write commands, the input/output circuit 170 may receive write data at the data terminals DQ, DQS, DM, together with a data strobe signal at DQS and a data mask signal at DM and provide the write data via the read/write amplifiers 165 to the memory cell array 145. Thus, the write data may be written in the memory cell designated by the row address and the column address. The IO circuit 170 may be coupled to a plurality of CRC combine circuits 170. The plurality of CRC combine circuits 170 and a plurality of CRC calculator circuits included in the IO circuit 170 may together perform CRC calculations for data error check.

Turning to the explanation of the external terminals included in the semiconductor device 100, the clock terminals CK_t and CK_c may receive an external clock signal and a complementary external clock signal, respectively. The external clock signals (including complementary external clock signal) may be supplied to a clock input circuit 105. The clock input circuit 105 may receive the external clock signals and generate an internal clock signal ICLK. The clock input circuit 105 may provide the internal clock signal ICLK to an internal clock generator 107. The internal clock generator 107 may generate a phase controlled internal clock signal LCLK based on the received internal clock signal ICLK and a clock enable signal CKE from the address/command input circuit 115. Although not limited thereto, a DLL circuit may be used as the internal clock generator 107. The internal clock generator 107 may provide the phase controlled internal clock signal LCLK to the IO circuit 170 and a timing generator 109. The IO circuit 170 may use the phase controller internal clock signal LCLK as a timing signal for determining an output timing of read data. The timing generator 109 may receive the internal clock signal ICLK and generate various internal clock signals.

The power supply terminals may receive power supply voltages VDD and VSS. These power supply voltages VDD and VSS may be supplied to a voltage generator circuit 190. The voltage generator circuit 190 may generate various internal voltages, VPP, VOD, VARY, VPERI, and the like based on the power supply voltages VDD and VSS. The internal voltage VPP is mainly used in the row decoder 130, the internal voltages VOD and VARY are mainly used in the sense amplifiers 150 included in the memory cell array 145, and the internal voltage VPERI is used in many other circuit blocks. The IO circuit 170 may receive the power supply voltages at power supply terminals VDDQ and VSSQ. For example, the power supply voltages may be the same voltages as the power supply voltages VDD and VSS, respectively. However, the dedicated power supply voltages from the power supply terminals VDDQ and VSSQ may be used for the IO circuit 170.

Figure 2A:
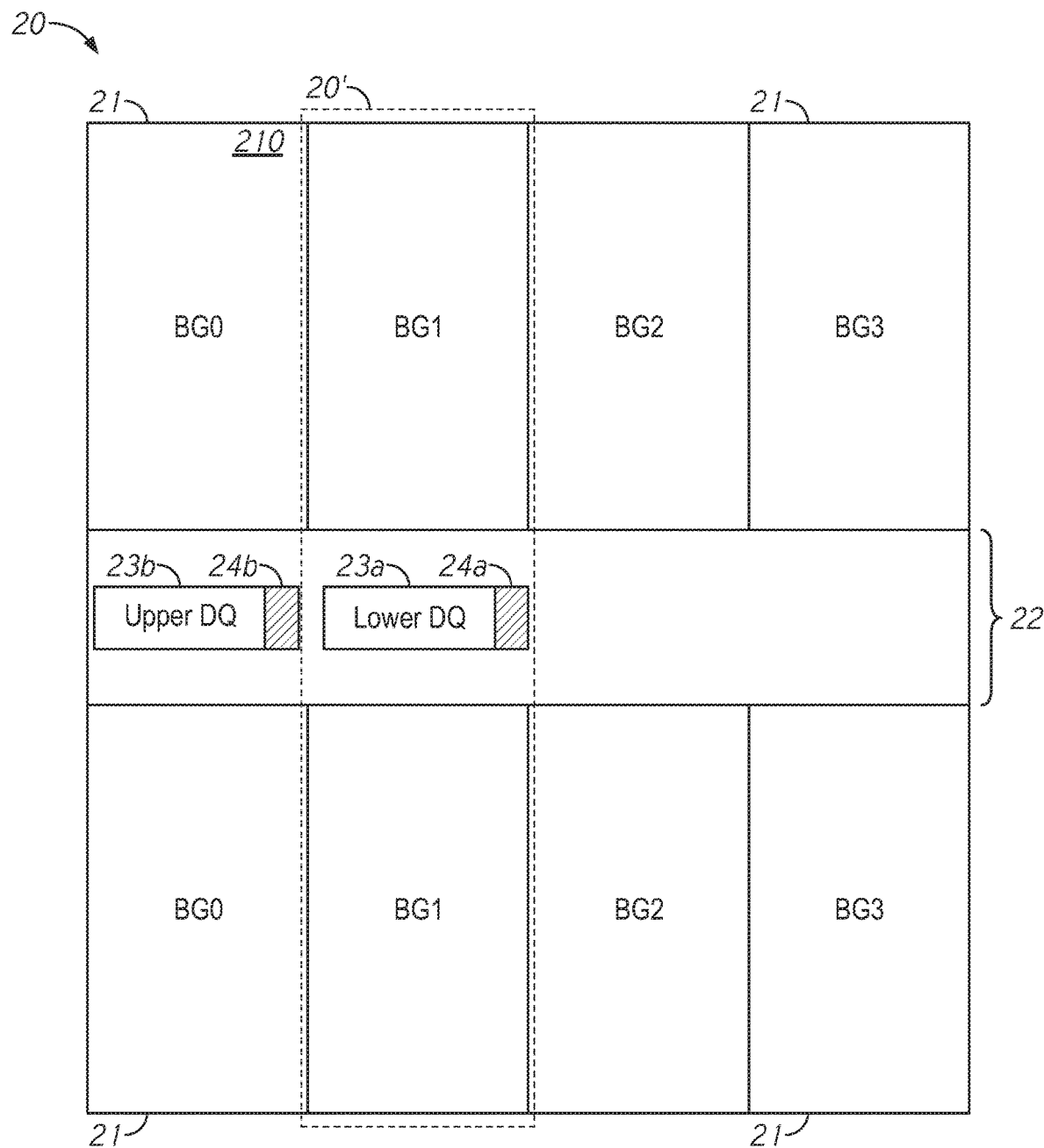
FIG. 2A is a schematic diagram of a memory device in accordance with an embodiment of the present disclosure.

FIG. 2A is a schematic diagram of a memory device 20 in accordance with an embodiment of the present disclosure. For example, the memory device 20 may be an apparatus 100 of FIG. 1. The memory device 20 may be a memory die, such as a DRAM die. The memory device 20 may include a plurality of bank groups BG0-BG3 21. The plurality of bank groups BG0-BG3 may include the plurality of banks BANKS-N of the memory cell array 145 of FIG. 1. Each bank group of the plurality of bank groups BG0-BG3 may be divided into two regions. The memory device 20 may also include a center region 22 disposed across the plurality of bank groups BG0-BG3, between the divided two regions of each bank group. The memory device 20 may further include a first plurality of data queue (DQ) circuits 23*a* and a second plurality of DQ circuits 23*b* disposed in the center region 22. For example, the first plurality of data queue (DQ) circuits 23*a* and a second plurality of DQ circuits 23*b* may be in the I/O circuit 170. For example, the first plurality of DQ circuits 23*a* may receive and transmit lower bits of data and the second plurality of DQ circuits may receive and transmit higher bits of data. The memory device 20 may further include CRC combine circuits 24*a* and 24*b* disposed in the center region 22. For example, the CRC circuit 24*a* may receive CRC calculation bits of each DQ circuit of the first plurality of DQ circuits 23*a*, and the CRC circuit 24*b* may receive CRC calculation bits of each DQ circuit of the first plurality of DQ circuits 23*b*.

Figure 2B:
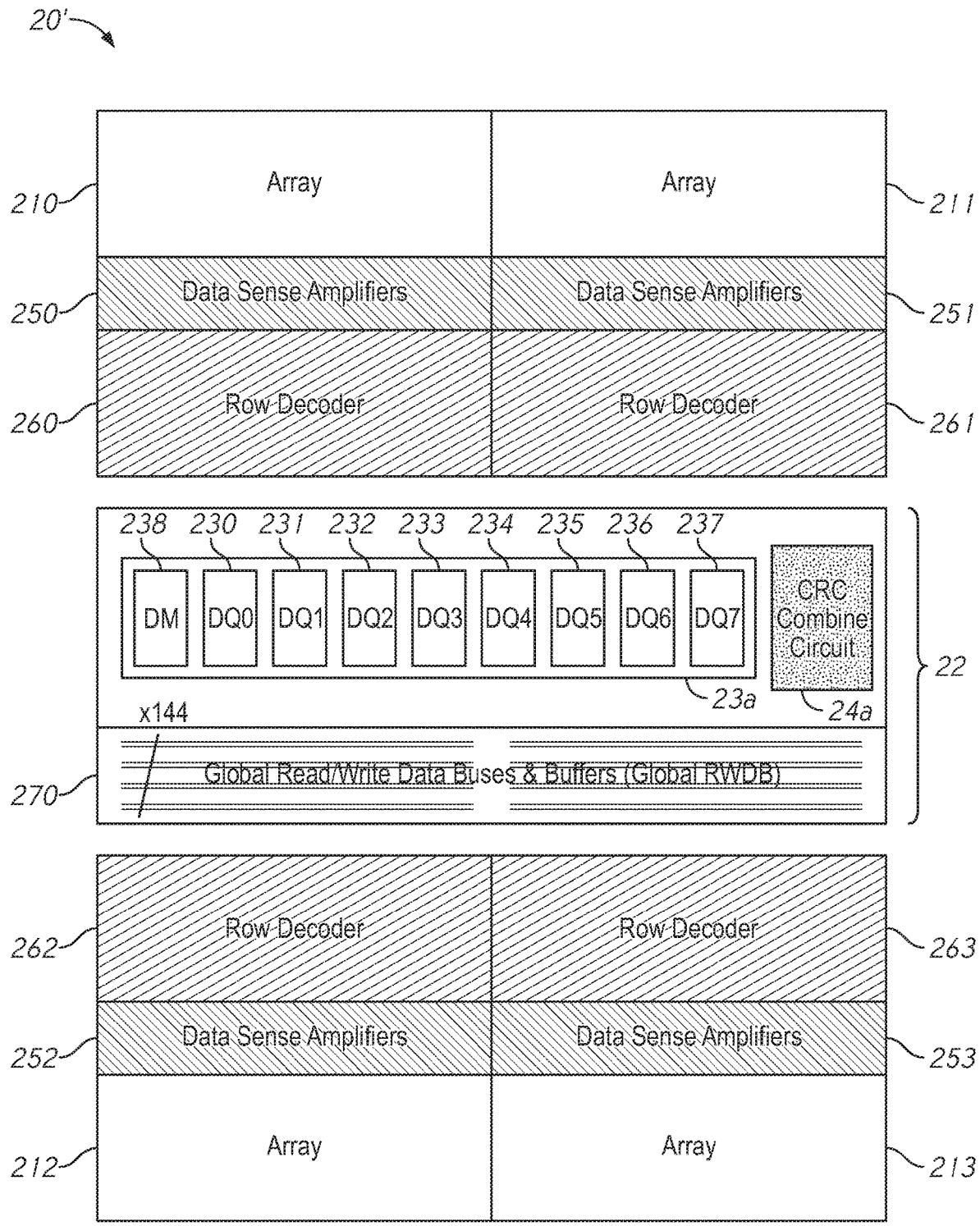
FIG. 2B is a schematic diagram of a portion of the memory device in accordance with an embodiment of the present disclosure.

The memory device 20 may include a portion 20', which includes the two regions of bank group BG1 and a portion of the center region 22. FIG. 2B is a schematic diagram of a portion 20' of the memory device 20 in accordance with an embodiment of the present disclosure. The portion 20' may include a bank group BG1 21 divided into two regions across the center region 22. The portion 20' may further include the first plurality of data queue (DQ) circuits 23a and the CRC combine circuit 24a shared across the plurality of bank groups BG0-BG3. A top region of the two regions may include arrays 210 and 211, and a bottom region of the two regions may include arrays 212 and 213. The top region may also include data sense amplifiers 250 and 251 and row decoders 260 and 261, both may be provided for the arrays 210 and 211, respectively. The bottom region may also include data sense amplifiers 252 and 253 and row decoders 262 and 263, both may be provided for the arrays 212 and 213, respectively. The memory device 20 may include the first plurality of DQ circuits 23a, including DQ circuits DQ0-DQ7 230-237 and a data mask (DM) circuit 238 disposed in the center region 22. The memory device 20 may also include the CRC combine circuit 24a disposed in the center region 22. The CRC combine circuit 24a may receive CRC calculation bits from the DQ circuits DQ0-DQ7 230-237 and the DM circuit 238. The memory device 20 may include a global read/write data busses and buffers (global RWDB) 270 disposed in the center region 22. For example, the global RWDB 270 may be disposed between the IO circuit 170 and RWAMP 165.

Figure 2C:
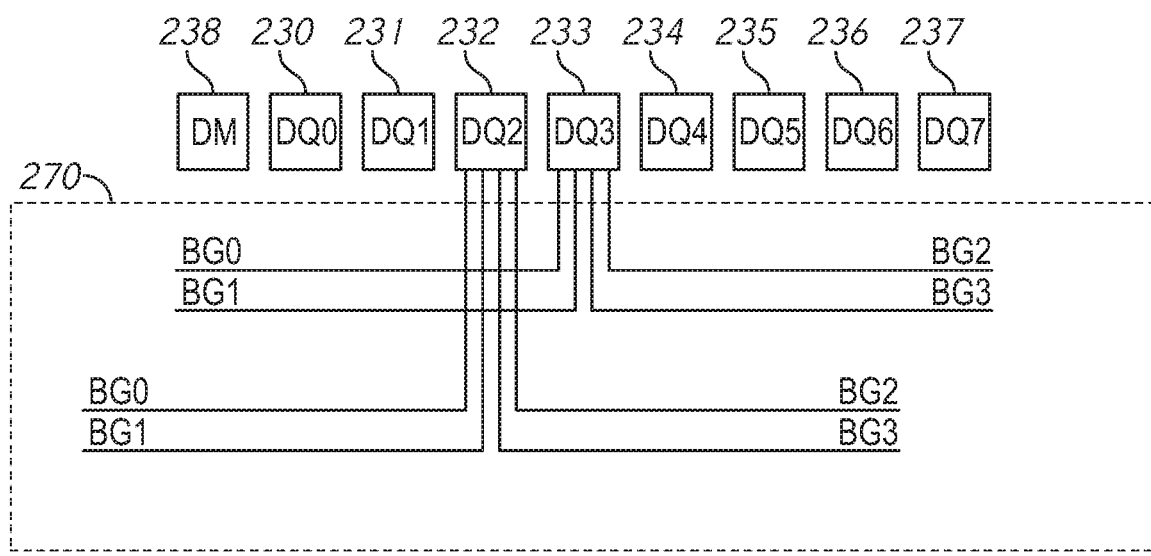
FIG. 2C is a schematic diagram of a portion of a center region in the memory device in accordance with an embodiment of the present disclosure.

FIG. 2C is a schematic diagram of a portion of the center region 270 in the memory device 20 in accordance with an embodiment of the present disclosure. As shown in FIG. 2C, each circuit of the DQ circuits DQ0-DQ7 230-237 and the DM circuit 238 provides data to the plurality of bank groups BG0-BG3 on global read/write data buses (lines) dedicated for each circuit. Thus, the DQ circuit DQ2 232 and the DQ circuit DQ3 233 do not share the global read/write data buses in FIG. 2C. Similarly, none of the DQ circuits DQ0-DQ7 230-237 and the DM circuit 238 shares the global read/write data buses with another DQ circuit of the plurality of DQ circuits 230-237. Global read/write data buses are shown for DQ2 and DQ3 in FIG. 2C. However, the center region 270 further includes additional read/write data buses for each of the other DQ circuits DQ0, DQ1, DQ4-DQ7, and the DM circuit.

Figure 3:
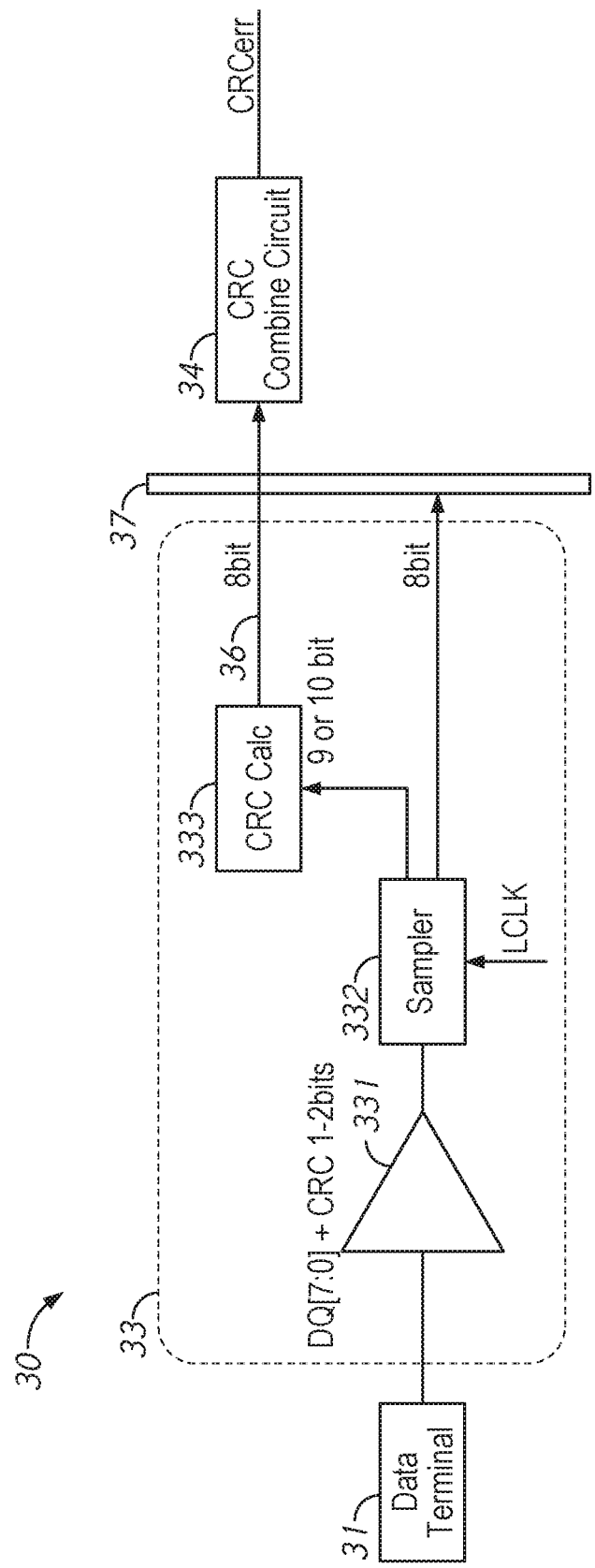
FIG. 3 is a block diagram of an apparatus in accordance with an embodiment of the present disclosure.

FIG. 3 is a block diagram of an apparatus 30 in accordance with an embodiment of the present disclosure. The apparatus 30 may be included in the memory device 20. The apparatus 30 may include a DQ circuit 33 and a CRC combine circuit 34. The DQ circuit 33 may be any of the DQ circuits DQ0-DQ7 230-237 and the DM circuit 238 of FIGS. 2A-2C and the CRC combine circuit 34 may be any of the CRC combine circuits 24a and 24b of FIGS. 2A-2B in some embodiments of the disclosure. The DQ circuit 33 may include a DQ buffer 331 that may receive a plurality of bits from a data terminal 31. For example, the data terminal 31 may be any of the data terminals DQ 171 and DM 172. The plurality of bits includes a plurality of data bits that constitutes 8-bit data byte[7:0] and one or more CRC check bits. For example, the one or more CRC bits may be provided by a memory controller (not shown). A number of CRC check bits for each data depends on a structure of the data, the details of which will be provided later referring to FIGS. 5A and 5B. As shown in the example of FIG. 3, a number of bits in the plurality of data bits is eight and the number of CRC check bits is one or two. The number of bits in the plurality of data bits and the number of CRC check bits may depend on data size and required accuracy. The plurality of bits received at the buffer 331 may be captured by a sampler 332. The sampler 332 may provide the plurality of data bits at a timing based on an internal clock (e.g., a local clock LCLK or a DQS clock) to a global data bus 37. The global data bus 37 may be, for example, a global read/write data bus dedicated for the DQ circuit 33 among the global RWDB 270. The sampler 332 may further provide the plurality of data bits and one or two CRC check bits to a CRC calculator circuit 333. The CRC calculator circuit 333 may include a combination of logic exclusive-OR (XOR) circuits. The CRC calculator circuit 333 may provide a plurality of CRC calculation bits. The plurality of CRC calculation bits is a result of a portion of the CRC calculation, which may be based on at least a portion of the plurality of data bits and the one or two CRC check bits. In this example, a number of bits in the plurality of CRC calculation bits is eight. The CRC calculator circuit 333 provides the CRC calculation bits to the CRC combine circuit 34. For example, in some embodiments of the disclosure, the apparatus 30 may include signal lines 36 having one end coupled to the CRC calculator circuit 333 and another end coupled to the CRC combine circuit 34. The CRC calculator circuit 333 provides the CRC calculation bits to the CRC combine circuit 34 on the signal lines 36 that are separate from the global data bus 37. By providing the CRC calculation bits on the signal lines 36 separate from the global data bus 37, the global data bus 37 may use less layout space compared to an arrangement where the CRC bits are provided over a global data bus. The CRC combine circuit 34 may be coupled to the CRC calculator circuit 333, and may receive the eight CRC calculation bits from the CRC calculator circuit 333 on the signal lines 36. Similarly, the CRC combine circuit 34 may receive the eight CRC calculation bits from the other circuits of the plurality of DQ circuits and the DM circuit (e.g., seven DQ circuits and one DM circuit). Thus, the CRC combine circuit 34 may receive a total of seventy-two CRC calculation bits (e.g., (8 DQ circuits×8 CRC calculation bits per DQ circuit)+(one DM circuit×8 CRC calculation bits per DM circuit)=64 CRC calculation bits+8 CRC calculation bits) and provide a CRC result signal CRCerr that is a binary signal indicative of whether data bits including the plurality of data bits contains any error.

Figure 4:
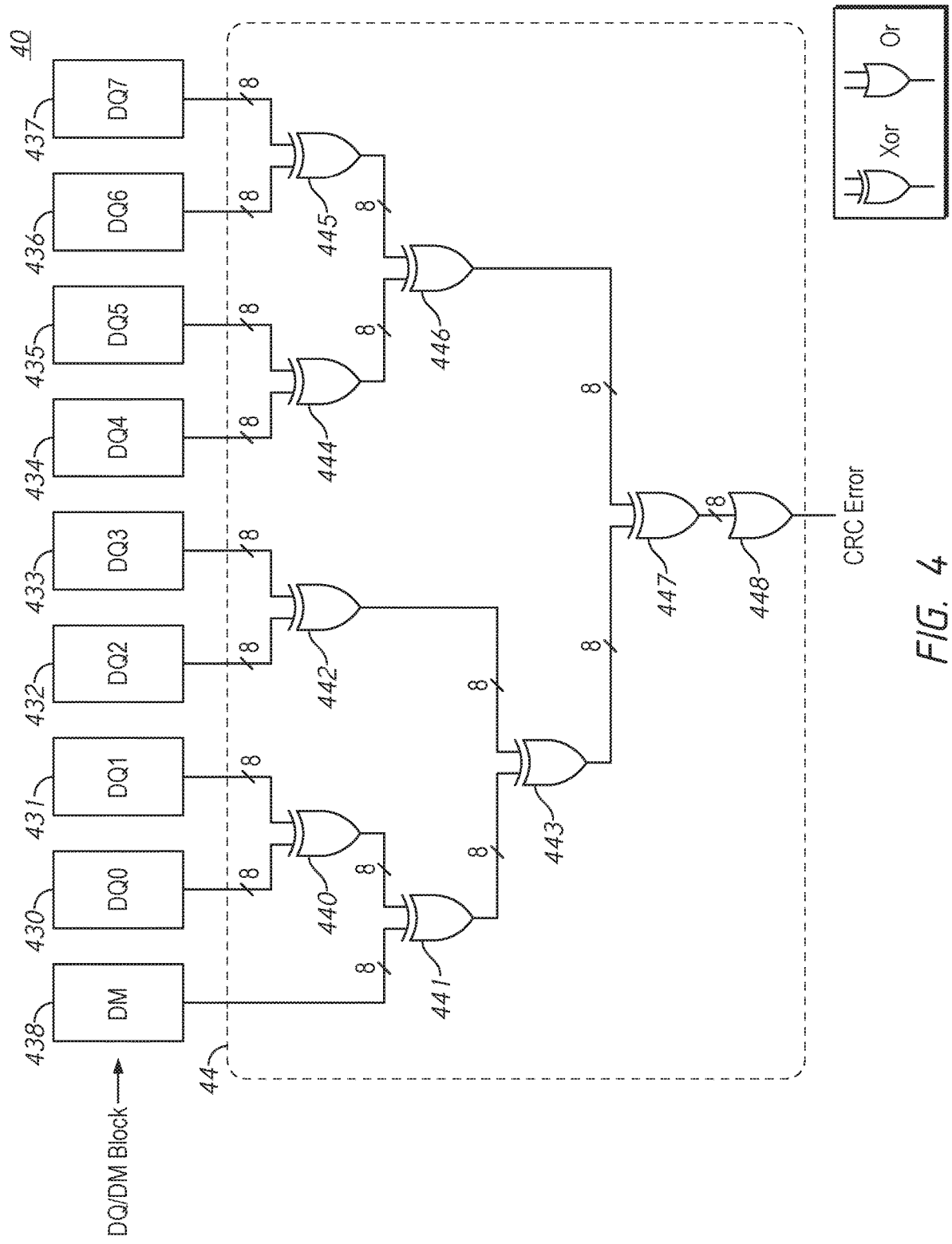
FIG. 4 is a schematic diagram of an apparatus in accordance with an embodiment of the present disclosure.

FIG. 4 is a schematic diagram of an apparatus 40 in accordance with an embodiment of the present disclosure. The apparatus 40 may be included in the memory device 20. The apparatus 40 may include a plurality of DQ circuits DQ0-DQ7 430-437, a DM circuit 438 and a CRC combine circuit 44. The DQ circuits DQ0-DQ7 430-437 and the DM circuit 438 may be included in the DQ circuits DQ0-DQ7 230-237 and the DM circuit 238 of FIGS. 2A-2C, and the CRC combine circuit 44 may be any of the CRC combine circuits 24a and 24b of FIGS. 2A-2B in some embodiments of the disclosure. The DQ circuits DQ0-DQ7 430-437 and the DM circuit 438 may have a structure of the DQ circuit 33 in some embodiments of the disclosure.

The CRC combine circuit 44 may include a plurality of logic XOR circuits 440-447 and a logic OR circuit 448. Each logic XOR circuit performs logic XOR operation of received eight bits from each of two DQ circuits and provides eight bits. For example, a logic XOR circuit 440 may receive eight CRC calculation bits from the DQ circuit DQ0 430 and eight CRC calculation bits from the DQ circuit DQ1 430, and provide eight intermediate CRC calculation bits to another logic XOR circuit 441. The logic XOR circuit 441 may receive the eight intermediate CRC calculation bits from the logic XOR circuit 441 and eight CRC calculation bits from the DM circuit 438 and provide eight intermediate CRC calculation bits to another logic XOR circuit 443. A logic XOR circuit 442 may receive eight CRC calculation bits from each of the DQ circuits DQ2 and DQ3 432 and 433, and provide eight intermediate CRC calculation bits to the logic XOR circuit 443. The logic XOR circuits 443 may receive the intermediate CRC calculation bits from each of the logic XOR circuits 441 and 442, and provide eight intermediate CRC calculation bits to the logic OR circuit 447. A logic XOR circuit 444 may receive eight CRC calculation bits from each of the DQ circuit DQ4 and DQ5 434 and 435, and provide eight intermediate CRC calculation bits to another logic XOR circuit 446. A logic XOR circuit 445 may receive eight CRC calculation bits from each of the DQ circuit DQ6 and DQ7 436 and 437, and provide eight intermediate CRC calculation bits to another logic XOR circuit 446. The logic XOR circuits 446 may receive the intermediate CRC calculation bits from both the logic XOR circuits 444 and 445, and provide eight intermediate CRC calculation bits to the logic NOR circuit 447. The logic NOR circuit 447 may receive the intermediate CRC calculation bits from both the logic XOR circuit 443 and 446, and provide eight intermediate CRC calculation bits to a logic OR circuit 448. The logic OR circuit 448 may perform a logic OR operation of all the eight intermediate CRC calculation bits and provide a CRC result signal CRCerr that is a binary signal indicative of whether the data contains any error.

Figure 5C:
FIG. 5C is a schematic diagram showing decomposing calculation related to one CRC checksum bit into the eight DQ circuits and the DM circuit in accordance with an embodiment of the present disclosure.

FIG. 5A is a table of CRC data bit mapping for an apparatus including eight DQ circuits and a DM circuit, in accordance with an embodiment of the present disclosure. The eight DQ circuits and the DM circuit may receive nine bits including eight data bits and one CRC bit. For example, in the table, DQ0 circuit may receive data bits d0-d7 (D[0]-D[7]) and a checksum bit CRC0. FIG. 5B is a list of equations to calculate each CRC bit of a plurality of CRC bits in FIG. 5A, in accordance with an embodiment of the present disclosure. A plurality of equations provide a plurality of results from a plurality of exclusive-OR operations of corresponding combinations of data bits taken from corresponding data bytes of a corresponding circuit of the DQ circuits and the DM circuit. FIG. 5C is a schematic diagram showing decomposing calculation related to one CRC checksum bit into the eight DQ circuits and the DM circuit in accordance with an embodiment of the present disclosure. For example, an equation regarding CRC[0] in FIG. 5B may compute an exclusive-OR operation of data bits D[69], D[68], D[67], D[66], D[64], D[63], D[60], D[56], D[54], D[53], D[52], D[50], D[49], D[48], D[45], D[43], D[40], D[39], D[35], D[34], D[31], D[30], D[28], D[23], D[21], D[19], D[18], D[16], D[14], D[12], D[8], D[7], D[6], and D[0]. The equation of computing CRC[0] may be decomposed into calculations of groups of data bits received in the DQ circuits and the DM circuit, and each circuit of the DQ circuits and DM circuit may calculate intermediate CRC calculation bits based on a corresponding group of data bits that are a subset of data bits received by each circuit. In some embodiments, the calculation of the intermediate CRC calculation bits may be performing an exclusive-OR operation of the corresponding group of data bits. For example, the above data bits regarding CRC[0] may be divided into a set of data bits D[69], D[68], D[67], D[66] and D[64] that may be received and calculated in the DM circuit, a set of D[63], D[60] and D[56] that may be received and calculated in the DQ7 circuit, a set of data bits D[54], D[53], D[52], D[50], D[49] and D[48], that may be received and calculated in the DQ6 circuit, a set of data bits D[45], D[43] and D[40] that may be received and calculated in the DQ5 circuit, a set of data bits D[39], D[35] and D[34] that may be received and calculated in the DQ4 circuit, a set of data bits D[31], D[30], D[28] that may be received and calculated in the DQ3 circuit, a set of data bits D[23], D[21], D[19], D[18], D[16] that may be received and calculated in the DQ2 circuit, a set of data bits D[14], D[12], D[8] that may be received and calculated in the DQ1 circuit, and a set of data bits D[7], D[6], D[0] and a checksum bit CRC0 bit that may be received and calculated in the DQ0 circuit, as shown in FIG. 5C. Similarly, the other equations regarding CRC[1]-CRC[7] may be decomposed into groups of data bits received in the DQ circuits and the DM circuit, and each circuit of the DQ circuits and DM circuit may calculate intermediate CRC calculation bits based on a corresponding group of data bits.

FIG. 6 is a schematic diagram of logical computation flows in the apparatus 40 of FIG. 4, in accordance with an embodiment of the present disclosure. FIG. 6 merely illustrates logical decomposition of CRC calculation, and arrows in FIG. 6 do not necessarily represent actual circuitry connections. CRC calculator circuits 630-638 in DQ circuits and a DM circuit respectively computes a plurality of exclusive-OR operations of corresponding group of data bits. In some embodiments, each CRC calculator circuit of the CRC calculator circuits 630-638 may include a plurality of logic exclusive-OR circuits. The CRC calculator circuit 630 in a DQ0 circuit may perform eight computations 6300-6307 regarding CRC[0]-CRC[7], using at least a portion of data bits received at the DQ0 circuit, respectively. In some embodiments of the disclosure, the computations 6300-6307 may be as previously described with reference to FIGS. 5A-5C. For example, the computation 6300 may be an exclusive-OR operation of data bits D[7], D[6] and D[0] in the CRC[0] computation and the checksum bit CRC[0]; the computation 6301 may be an exclusive-OR operation of data bits D[6], D[1] and D[0] in the CRC[1] computation; the computation 6302 may be an exclusive-OR operation of data bits D[6], D[2], D[1] and D[0] in the CRC[2] computation; the computation 6303 may be an exclusive-OR operation of data bits D[7], D[3], D[2] and D[1] in the CRC[3] computation; the computation 6304 may be an exclusive-OR operation of data bits D[4], D[3] and D[2] in the CRC[4] computation; the computation 6305 may be an exclusive-OR operation of data bits D[5], D[4] and D[3] in the CRC[5] computation; the computation 6306 may be an exclusive-OR operation of data bits D[6], D[5] and D[4] in the CRC[6] computation; and the computation 6307 may be an exclusive-OR operation of data bits D[7], D[6] and D[5] in the CRC[7] computation. [33] Similarly, the CRC calculator circuit 637 in a DQ7 circuit may execute eight computations 6370-6377 regarding CRC[0]-CRC[7] by performing exclusive-OR operations of groups of data bits that are subsets of the data bits D[56]-D[63] and the CRC checksum bit CRC[7] received by the DQ7 circuit, respectively. The CRC calculator circuit 638 in the DM circuit may execute eight computations 6380-6387 regarding CRC[0]-CRC[7] by performing exclusive-OR operations of groups of data bits that are subsets of the data bits D[64]-D[71] received by the DM circuit, respectively. [34] The CRC combine circuit 64 may include a plurality of exclusive-OR (XOR) tree circuits 640-647. For example, an XOR tree circuit 640 may receive a computation result of one CRC calculation bit from each computation of computations 6300, . . . 6370 and 6380 regarding CRC[0] and performs an exclusive-OR operation of these 8 bits, and provide one result bit CRCresult[0] to an OR circuit 648. If there is no error in data bits D[0]-D[7], the CRCresult[0] is "0" (e.g., at a logic low level), because the computations in the CRC calculator circuit 630 included the CRC checksum bit CRC [0]. Similarly, an XOR tree circuit 641 may receive a computation result of one bit from each computation of computations 6301, . . . 6371 and 6381 regarding CRC[1] and performs an exclusive-OR operation of these 8 bits, and provide one bit result CRCresult[1] to the OR circuit 648. Also, an XOR tree circuit 647 may receive a computation result of one bit from each computation of computations 6307, . . . 6377 and 6387 regarding CRC[7] and performs an exclusive-OR operation of these 8 bits, and provide one bit result CRCresult[7] to the OR circuit 648. The OR circuit 648 may receive a total of eight bits, which are CRC results[0]-[7] and perform a logic OR operation of the total of eight bits. Since if there is any error, any of the CRC results[0]-[7] may indicate an error as "1" (e.g., a logic high level), thus the result of the logic OR operation is also "1" and the CRC result (CRCerr) is at a logic high level "1" indicative of data failure. If there is no error in data, all the CRC results[0]-[7] is "0" (e.g., a logic low level) indicative of the data bits containing no error, thus the result of the logic OR operation is also "0" and the CRC result (CRCerr) is at a logic low level "0" indicative of the data containing no error (=pass).

By decomposing CRC computations among CRC calculator circuits of the plurality of DQ circuits and the DM circuit and the CRC combine circuit directly coupled to the plurality of DQ circuits and the DM circuit, an area for data buses dedicated for CRC data may be reduced. As shown here, a large portion of exclusive-OR operations are executed in the plurality of DQ circuits and the DM circuit. Because of executing exclusive-OR operations of data bits received at CRC calculator circuits of the plurality of DQ circuits and the DM circuit, logic XOR gates executing the same combination of exclusive-OR operations across the CRC computations in each CRC calculator circuit (e.g., exclusive-OR operation of D[0] and D[6] in the CRC calculator circuit 630) may be shared by the plurality of computations, such as the computation 6300 regarding CRC [0] and the computation 6301 regarding CRC[1].

Figure 7:
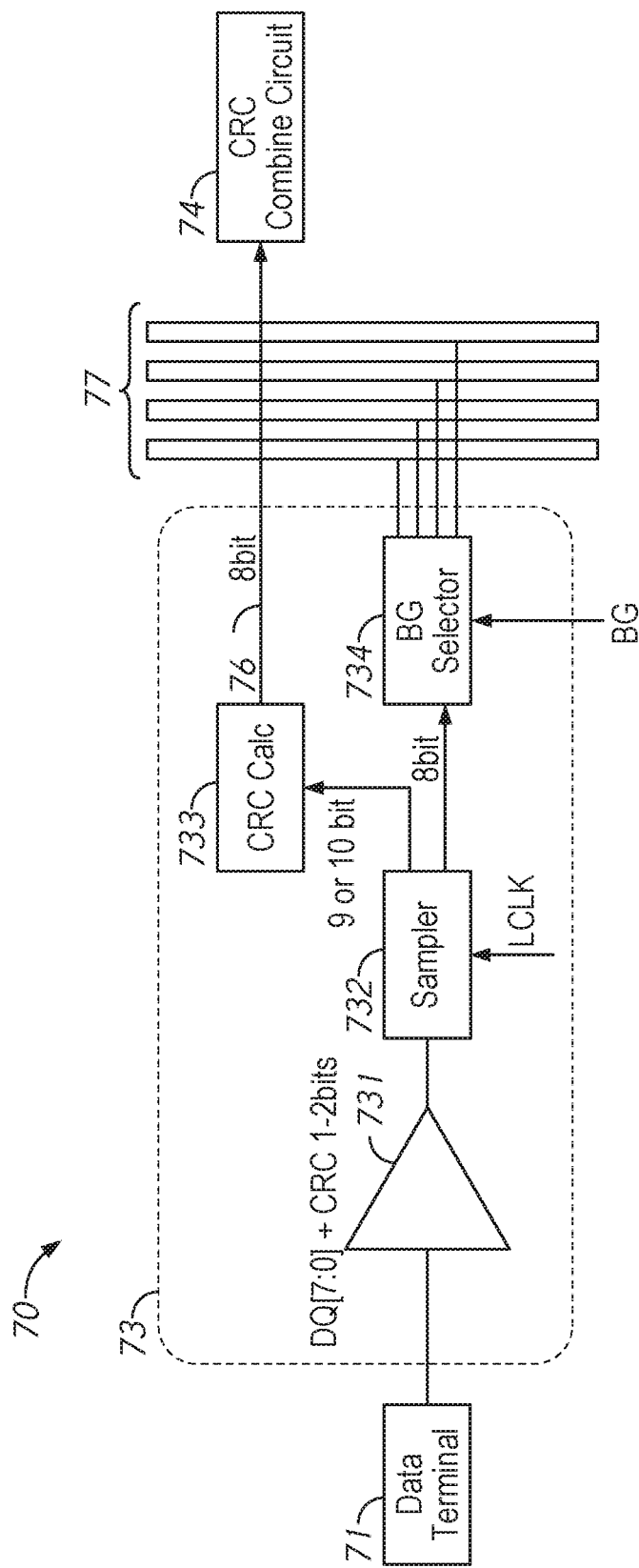
FIG. 7 is a block diagram of an apparatus in accordance with an embodiment of the present disclosure.

FIG. 7 is a block diagram of an apparatus 70 in accordance with an embodiment of the present disclosure. The apparatus 70 may be included in the memory device 20 in some embodiments of the disclosure. A circuit structure of the apparatus 70 of FIG. 7 is similar to the circuit structure previously described with reference to FIG. 3. As such, detailed description regarding a data terminal 71, a buffer 731 and a CRC calculator circuit 733 included in a DQ circuit 73 and a CRC combine circuit 74 is omitted in the interest of brevity. The sampler 732 may provide the plurality of data bits from the buffer 731 at a timing based on an internal clock (e.g., a local clock LCLK or a DQS clock) to the CRC calculator circuit 733 and a bank group selector circuit 734. The bank group selector 734 may select a bank group based on an address, such as a portion of a bank address. For example, the bank group selector 734 may receive one or more bank group signals BG based on the bank address and provide the plurality of data bits to a data bus of a plurality of global data buses 77 corresponding to the selected bank group indicated by the bank group signals BG. In FIG. 7, the bank group selector 734 may be included in the DQ circuit 73; however, the bank group selector 734 may be disposed outside the DQ circuit 73. The CRC combine circuit 74 may receive the eight CRC calculation bits from the CRC calculator circuit 733 on signal lines 76. Similarly, the CRC combine circuit 34 may receive the eight CRC calculation bits from the other circuits of the plurality of DQ circuits and the DM circuit. Thus, the CRC combine circuit 74 may receive a total of seventy-two CRC calculation bits and provide a CRC result signal CRCerr that is a binary signal indicative of whether the data contains any error. Since the CRC combine circuit 74 receives the CRC calculation bits directly from the plurality of DQ circuits and the DM circuit on signal lines, not from the plurality of global data buses, the plurality of global data buses 77 do not need to include data buses which transmit CRC bits and the CRC combine circuit 74 does not have to include a bank group selector circuit to receive data from the plurality of global data buses 77.

Figure 8:
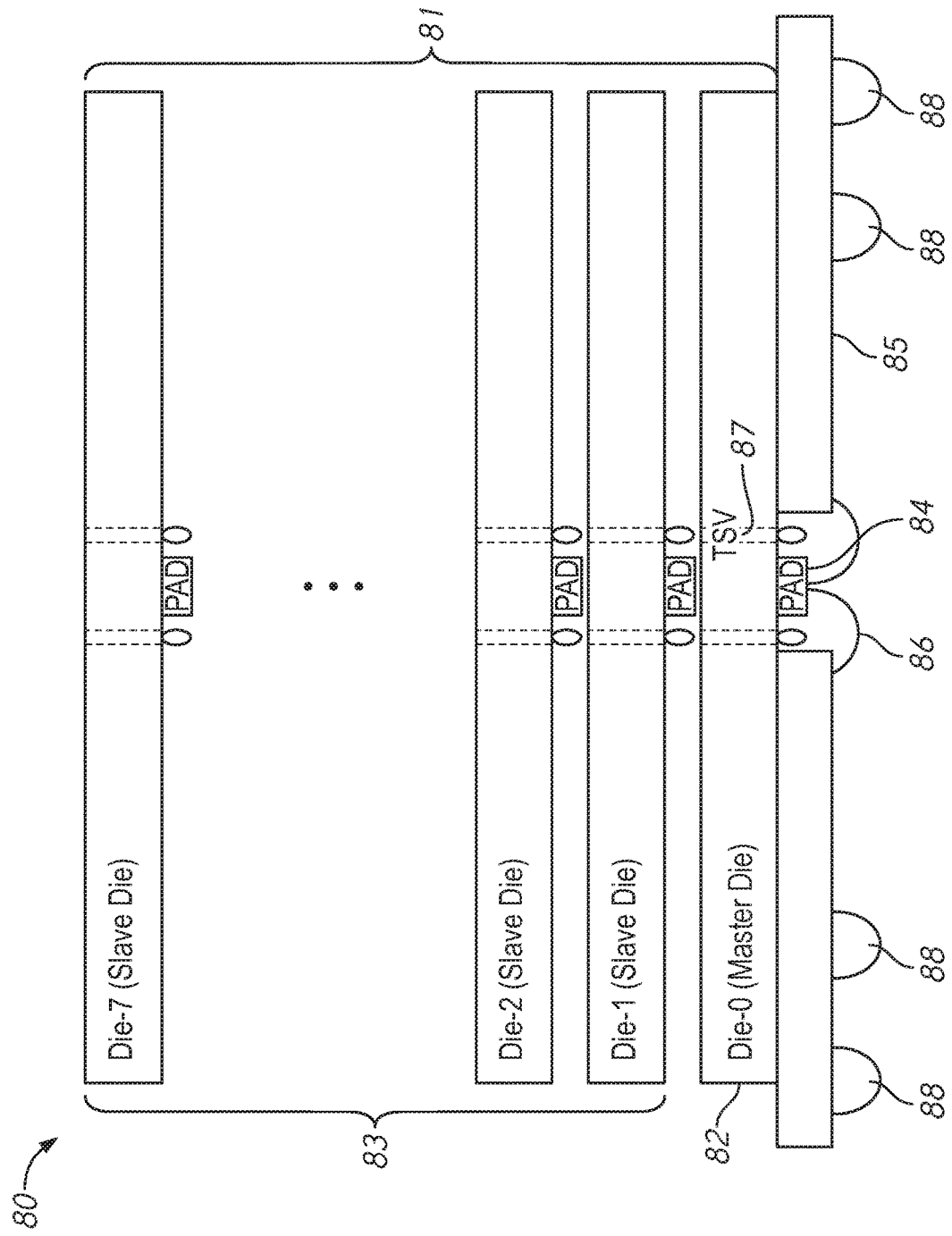
FIG. 8 is a schematic diagram of a memory device including a plurality of dies in accordance with an embodiment of the present disclosure.

FIG. 8 is a schematic diagram of a memory device 80 including a plurality of dies 81 in accordance with an embodiment of the present disclosure. In this embodiment, the number of the plurality of dies 81 is eight. Modifications including changing to a different number of dies in place of the plurality of dies 81 are within the scope of disclosure. In some embodiments, the plurality of dies 81 may be identical with each other with respect to circuit configurations and operations. For example, the plurality of dies 81 may be stacked dies including a master die (Die-0) 82 and a plurality of slave dies (Die-1 to Die-7) 83. In some embodiments, the plurality of dies 81 may all have the same design (e.g., include the same circuits). The dies 81 may be configured during post-manufacturing to perform as either a master die or a slave die. For example, the plurality of dies 81 may be configured in a manner that one die may perform as the master die 82 and the other dies may perform as the slave dies 83 respectively. Alternatively, in some embodiments, the master die 82 and the slave dies 83 may be designed and manufactured as a native master die and native slave dies.

The master die 82 may serve as a includes one or more pads PAD 84 that are coupled to a package substrate 85 via one or more bonding wires 86. The one or more bonding wires 16 may be coupled to lands (not shown) of the package substrate 85. Bonding Pads (PAD) of each of the plurality of slave dies 83 may be in a floating state, decoupled from the package substrate 85. The master die 81 may communicate with each of the slave dies 83 by way of vias TSV 87 (e.g., through-substrate or through-silicon vias). Bump electrodes 88 may be disposed on an outer surface of the package substrate 88. The bump electrodes 88 may be coupled to power lines or signal channels.

Figure 9:
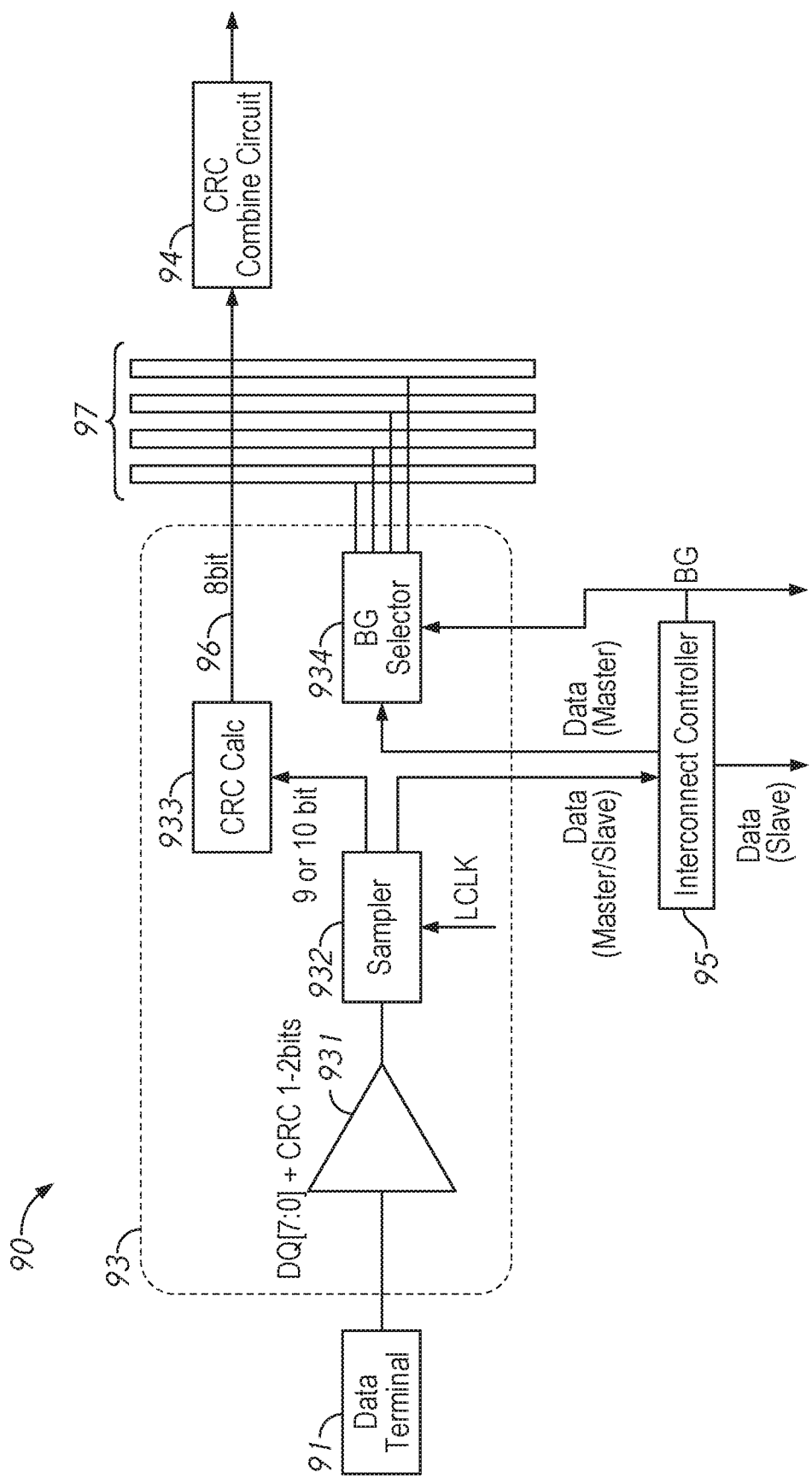
FIG. 9 is a block diagram of an apparatus in accordance with an embodiment of the present disclosure.

FIG. 9 is a block diagram of an apparatus 90 in accordance with an embodiment of the present disclosure. The apparatus 90 may be the master die 82 in the memory device 80. A circuit structure of FIG. 9 is similar to the circuit structure previously described with reference to FIG. 3. The apparatus 90, the master die includes a data queue circuit 93 and a CRC combine circuit 94. The data queue circuit 93 may include a buffer 931, a CRC calculator circuit 933 and a bank group selector 934. As such, detailed description regarding a data terminal 91, a buffer 931 and a CRC combine circuit 94 is omitted in the interest of brevity. The sampler 932 may provide the plurality of data bits from the buffer 931 at a timing based on an internal clock (e.g., a local clock LCLK or a DQS clock) to the CRC calculator circuit 933 and to an interconnect controller 95. The interconnect controller 95 may provide the plurality of data bits to the master die as well as slave dies, such as the slave dies 83 in the memory device 80. For example, the interconnect controller 95 may provide the plurality of data bits designated to a memory cell array of one of the slave dies and one or more bank group signals BG to a bank group selector in the one of the slave dies (not shown) by way of vias, such as the vias TSV 87. The interconnect controller 95 may provide the plurality of data bits designated to a memory cell array of the master die to a bank group selector 934. The bank group selector 934 may select a bank group based on the bank group address BG, and provide the plurality of data bits to a data bus of a plurality of global data buses 97 corresponding to the selected bank group. The CRC calculator circuit 933 may provide a plurality of CRC calculation bits as a result of a portion of CRC calculation of at least a portion of the plurality of data bits and the one or two CRC check bits. The CRC combine circuit 94 in the apparatus 90 as the master die may receive the eight CRC calculation bits from the CRC calculator circuit 933 on signal lines 96. Similarly, the CRC combine circuit 94 may receive the eight CRC calculation bits from the other CRC calculator circuits of the plurality of DQ circuits and the DM circuit. Thus, the CRC combine circuit 94 may receive a total of seventy-two CRC calculation bits of the plurality of data bits and provide a CRC result signal CRCerr that is a binary signal indicative of whether the data contains any error. Because the CRC calculation is completed in the CRC calculator circuits 933 in the plurality of DQ circuits and the DM circuit and the CRC combine circuit 94, all included in the master die 90, there is no TSVs to transmit and receive CRC bits to and from the slave dies. In some embodiments, the master die and the slave dies may be uniformly formed to be capable to perform as either a master die or a slave die by post-manufacturing configuration, then data terminals, buffers, samplers and CRC related circuits in the slave dies are not activated. A bank group selector in the DQ circuit on the slave dies may be activated to receive data and the bank group signals BG from the master die by way of vias, such as the vias TSV 87. In some embodiments, a master die and slave dies may be manufactured separately, and there is no CRC related circuits included in the slave dies.

FIGS. 3, 7 and 9 are examples of DQ circuits perform portions of CRC calculation for write operations. However, DQ circuits may perform portions of CRC calculation for read operations. Logic levels of signals and logic gate combinations used in the embodiments described the above are merely examples. However, in other embodiments, combinations of logic levels of signals and combinations of logic gates other than those specifically described in the present disclosure may be used without departing from the scope of the present disclosure.

Although various embodiments have been disclosed in the present disclosure, it will be understood by those skilled in the art that the scope of the disclosure extends beyond the specifically disclosed embodiments to other alternative embodiments and/or uses and obvious modifications and equivalents thereof. In addition, other modifications which are within the scope of this disclosure will be readily apparent to those of skill in the art based on this disclosure. It is also contemplated that various combination or sub-combination of the specific features and aspects of the embodiments may be made and still fall within the scope of the disclosure. It should be understood that various features and aspects of the disclosed embodiments can be combined with or substituted for one another in order to form varying embodiments. Thus, it is intended that the scope of at least some of the present disclosure should not be limited by the particular disclosed embodiments described above.

What is claimed is:

1. An apparatus comprising:
 a data queue circuit comprising:
  a sampler configured to receive a plurality of data bits and one or more check bits and further configured to provide the plurality of data bits and the one or more check bits to a first output and provide the plurality of data bits to a second output with timing based on an internal clock; and
  a cyclic redundancy check (CRC) calculator circuit configured to receive the plurality of data bits and the one or more check bits from the first output of the sampler and further configured to generate a plurality of CRC calculation bits wherein each of the plurality of CRC calculation bits is based on a subset of the plurality of data bits, and wherein one of the CRC calculation bits is based on a portion of the plurality of data bits and the one or more check bits,
 wherein the one or more check bits are based, at least in part, on the portion of the plurality of data bits and on one or more data bits received by another data queue circuit that are different from the plurality of data bits.

2. The apparatus of claim 1, further comprising:
 a global data bus coupled to the data queue circuit, wherein the global data bus is configured to receive the plurality of data bits from the second output of the sampler of the data queue circuit; and
 a plurality of signal lines separate from the global data bus,
 wherein the CRC calculator circuit is configured to provide the plurality of CRC calculation bits on the plurality of signal lines.

3. The apparatus of claim 1, further comprising a plurality of global data buses coupled to the data queue circuit, wherein each global data bus of the plurality of global data buses is configured to transmit data to a corresponding bank group of a plurality of bank groups,
 wherein the data queue circuit further comprises a bank group selector configured to receive the plurality of data bits from the sampler and further configured to provide the plurality of data bits to a corresponding global data bus of the corresponding bank group among the plurality of global data buses.

4. The apparatus of claim 1, wherein the CRC calculator circuit is configured to perform a plurality of computations using at least a portion of the plurality of data bits to generate the CRC calculation bits.

5. The apparatus of claim 4, wherein the CRC calculator circuit includes:
 a plurality of logic exclusive-OR circuits configured to perform the plurality of computations.

6. The apparatus of claim 5, wherein the plurality of computations includes a first computation and a second computation, and
 wherein the first and second computations are configured to share one logic exclusive-OR circuit of the plurality of logic exclusive-OR circuits.

7. The apparatus of claim 1, further comprising:
 a CRC combine circuit configured to receive the plurality of CRC calculation bits, and further configured to generate a result signal indicative of whether data bits including the plurality of data bits contains an error based, at least in part, on the plurality of CRC calculation bits; and
 a wire having one end coupled to the CRC calculator circuit and another end coupled to the CRC combine circuit, wherein the wire is configured to transmit at least one of the plurality of CRC calculation bits from the CRC calculation circuit to the CRC combine circuit.

8. The apparatus of claim 7, wherein the CRC combine circuit comprises:

a plurality of logic exclusive-OR circuits wherein each logic exclusive-OR circuit is configured to receive a corresponding CRC calculation bit of the plurality of CRC calculation bits and further configured to provide a result bit responsive to, at least in part, to the corresponding CRC calculation bit; and a logic OR circuit configured to receive the result bit and further configured to provide the result signal responsive to, at least in part, to the result bit.

9. An apparatus including:

a plurality of data queue circuits, each data queue circuit of the plurality of data queue circuits comprising a respective one of a plurality of cyclic redundancy check (CRC) calculator circuits, each respective CRC calculator circuit of the plurality of CRC calculator circuits configured to receive a plurality of data bits and one or more check bits and further configured to generate a plurality of CRC calculation bits, wherein each of the plurality of CRC calculation bits is based on a subset of the plurality of data bits, and wherein one of the plurality of CRC calculation bits is based on a portion of the plurality of data bits and the one or more check bits; and a CRC combine circuit configured to receive the plurality of CRC calculation bits from each CRC calculator circuit of the plurality of the CRC calculator circuits, and further configured to generate a result signal based, at least in part, on the plurality of CRC calculation bits, wherein the one or more check bits are based on the portion of the plurality of data bits and on one or more data bits received by each data queue circuit of the plurality of data queue circuits.

10. The apparatus of claim 9, further comprising a plurality of signal lines, each signal line of the plurality of signal lines having one end coupled to the CRC calculator circuit and another end coupled to the CRC combine circuit, wherein the plurality of signal lines are configured to carry the plurality of CRC calculation bits.

11. The apparatus of claim 9, wherein the CRC calculator circuit comprises a plurality of logic exclusive-OR circuits.

12. The apparatus of claim 9, further comprising a plurality of data terminals, each data terminal of the plurality of data terminals is coupled to each respective data queue circuit of the plurality of the data queue circuits, wherein each of the respective CRC calculator circuits are configured to perform a plurality of computations, wherein each computation of the plurality of computations is configured to provide a corresponding CRC calculation bit of the plurality of CRC calculation bits responsive to the at least a portion of the plurality of data bits from the data terminal.

13. The apparatus of claim 12, wherein the plurality of data queue circuits comprises a first data queue circuit and a second data queue circuit, wherein the CRC calculator circuit is a first CRC calculator circuit in the first data queue circuit, the first CRC calculator circuit configured to receive the plurality of data bits that are a first plurality of data bits and the one or more check bits that are one or more first check bits, and further configured to provide the plurality of CRC calculation bits that are a first plurality of CRC calculation bits, and wherein the plurality of CRC calculator circuits further comprises a second CRC calculator circuit in the second data queue circuit, the second CRC calculator circuit configured to receive a second plurality of data bits and one or more second check bits and further configured to provide a second plurality of CRC calculation bits.

14. The apparatus of claim 13, wherein the first plurality of CRC calculation bits includes a first CRC calculation bit and a second CRC calculation bit, wherein the second plurality of CRC calculation bits includes a third CRC calculation bit and a fourth CRC calculation bit, wherein the CRC combine circuit comprises:

a first logic exclusive-OR circuit configured to receive the first CRC calculation bit and the third CRC calculation bit, and further configured to provide a first result bit; and a second logic exclusive-OR circuit configured to receive the second CRC calculation bit and the fourth CRC calculation bit, and further configured to provide a second result bit.

15. The apparatus of claim 14, further comprising a logic OR circuit configured to receive the first result bit and the second result bit, and further configured to provide the result signal responsive to, at least in part, to the first and second result bits.

16. An apparatus comprising:

a first die comprising:

a plurality of first memory cells;

a plurality of data queue circuits comprising a plurality of CRC calculator circuits, wherein each CRC calculator circuit of the plurality of CRC calculator circuits in each data queue circuit of the plurality of data queue circuits is configured to receive a corresponding plurality of data bits and one or more corresponding check bits and further configured to generate a corresponding plurality of CRC calculation bits, wherein each of the plurality of CRC calculation bits is based on a subset of the corresponding plurality of data bits and wherein one of the plurality of CRC calculation bits is based on a portion of the plurality of data bits and the one or more check bits; and a CRC combine circuit configured to receive the corresponding plurality of CRC calculation bits from the plurality of CRC calculator circuits, and further configured to generate a result signal based, at least in part, on the corresponding plurality of CRC calculation bits from the plurality of CRC calculator circuits; and a second die stacked with the first die, the second die comprising a plurality of second memory cells, wherein the one or more corresponding check bits for a first data queue circuit of the plurality of data queue circuits are based, at least in part, on the portion of the plurality of data bits and one or more data bits of the plurality of data bits of a second data queue circuit of the plurality of data queue circuits that are different from the plurality of data bits for the first data queue circuit.

17. The apparatus of claim 16, wherein the first die further comprises a plurality of signal lines, each signal line of the plurality of signal lines having one end coupled to each CRC calculator circuit and another end coupled to the CRC combine circuit, wherein the plurality of signal lines are configured to carry the plurality of CRC calculation bits.

18. The apparatus of claim 16, wherein the plurality of data queue circuits comprise a first data queue circuit including:

a first CRC calculator circuit included in the plurality of CRC calculator circuits; and a sampler configured to receive a first plurality of data bits and one or more first check bits and further configured to provide the first plurality of data bits and the one or more first check bits to the first CRC calculator circuit, and wherein the sampler is further configured to provide the first plurality of data bits to the second die.

19. The apparatus of claim 18, further comprising a plurality of global data buses coupled to the first data queue circuit, wherein each global data bus of the plurality of global data buses is configured to transmit data to a corresponding bank group of a plurality of bank groups, wherein the first data queue circuit further comprises a bank group selector configured to receive the first plurality of data bits from the second die, and wherein the bank group selector is configured to provide the first plurality of data bits to a corresponding global data bus of the corresponding bank group among the plurality of global data buses.

20. The apparatus of claim 16, wherein the first die and the second die have the same design, and wherein the first die is configured to perform as a master die and the second die is configured to perform as a slave die.

\* \* \* \* \*